(12) United States Patent
Wang et al.

(10) Patent No.: US 10,825,447 B2
(45) Date of Patent: Nov. 3, 2020

(54) METHOD AND APPARATUS FOR OPTIMIZING MODEL APPLICABLE TO PATTERN RECOGNITION, AND TERMINAL DEVICE

(71) Applicant: HUAWEI TECHNOLOGIES CO., LTD., Shenzhen (CN)

(72) Inventors: Xiyong Wang, Shenzhen (CN); Hongrui Jiang, Shenzhen (CN); Huajun Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 16/313,044

(22) PCT Filed: Jun. 21, 2017

(86) PCT No.: PCT/CN2017/089417
§ 371 (c)(1),
(2) Date: Dec. 23, 2018

(87) PCT Pub. No.: WO2017/219991
PCT Pub. Date: Dec. 28, 2017

(65) Prior Publication Data
US 2019/0228762 A1    Jul. 25, 2019

(30) Foreign Application Priority Data

Jun. 23, 2016 (CN) .......................... 2016 1 0472755

(51) Int. Cl.
*G10L 15/06* (2013.01)
*G10L 15/065* (2013.01)
(Continued)

(52) U.S. Cl.
CPC .............. *G10L 15/063* (2013.01); *G06K 9/03* (2013.01); *G06K 9/6227* (2013.01);
(Continued)

(58) Field of Classification Search
CPC ..... G10L 15/063; G10L 15/065; G10L 15/44; G10L 15/16; G10L 15/30; G06K 9/03; G06K 9/6227; G06K 9/6262
See application file for complete search history.

(56) References Cited

U.S. PATENT DOCUMENTS

| 9,582,716 B2* | 2/2017 | Prabhakar ............. G06T 3/4023 |
| 10,380,499 B2* | 8/2019 | Ylipaavalniemi ..... G06N 20/00 |
| 2005/0137866 A1 | 6/2005 | Dow et al. |
| 2010/0312555 A1 | 12/2010 | Plumpe et al. |

(Continued)

FOREIGN PATENT DOCUMENTS

| CN | 102270450 A | 12/2011 |
| CN | 103632667 A | 3/2014 |

(Continued)

OTHER PUBLICATIONS

Bin Fang, Research-on-Adaptive-Method-in-Speech-Recognition, CNKI, Feb. 2007, with partial English translation, Total 68 pages.

*Primary Examiner* — Mohammad K Islam
(74) *Attorney, Agent, or Firm* — Kilpatrick Townsend & Stockton LLP

(57) ABSTRACT

Embodiments of the present invention relate to a method and an apparatus for optimizing a model applicable to pattern recognition, and a terminal device. The terminal device receives a universal model delivered by a server, where the universal model includes an original feature parameter; recognizes target information by using the universal model, and collects a plurality of local samples; when a model optimization condition is met, corrects the original feature parameter by using a first training algorithm to obtain a new feature parameter; and optimizes the universal model according to a second training algorithm and the new feature parameter, to obtain an optimized universal model. That is, in the present invention, the terminal device further optimizes, according to the collected local samples, the univer- (Continued)

sal model received from the server to obtain a relatively personalized model applicable to pattern recognition.

15 Claims, 3 Drawing Sheets

(51) Int. Cl.
    *G06K 9/03*         (2006.01)
    *G06K 9/62*         (2006.01)
    *G10L 15/14*       (2006.01)
    *G10L 15/16*       (2006.01)
    *G10L 15/30*       (2013.01)

(52) U.S. Cl.
    CPC .......... *G06K 9/6262* (2013.01); *G10L 15/065* (2013.01); *G10L 15/144* (2013.01); *G10L 15/16* (2013.01); *G10L 15/30* (2013.01)

(56) References Cited

U.S. PATENT DOCUMENTS

| | | |
|---|---|---|
| 2014/0214420 A1 | 7/2014 | Yao et al. |
| 2015/0170053 A1 | 6/2015 | Miao |
| 2018/0211649 A1 | 7/2018 | Li |
| 2018/0358003 A1* | 12/2018 | Calle ........................ G10L 21/02 |
| 2019/0019059 A1* | 1/2019 | Lee ........................ G06K 9/6202 |
| 2019/0377930 A1* | 12/2019 | Chen .................. G06K 9/00087 |
| 2020/0184200 A1* | 6/2020 | Wang ........................ G06N 3/08 |

FOREIGN PATENT DOCUMENTS

| | | |
|---|---|---|
| CN | 105096941 A | 11/2015 |
| CN | 105206258 A | 12/2015 |
| CN | 105489221 A | 4/2016 |
| JP | 2002331723 A | 11/2002 |
| JP | 2015132877 A | 7/2015 |
| WO | 2006137246 A1 | 12/2006 |
| WO | 2014096506 A1 | 6/2014 |
| WO | 2016032777 A1 | 3/2016 |

\* cited by examiner

METHOD AND APPARATUS FOR OPTIMIZING MODEL APPLICABLE TO PATTERN RECOGNITION, AND TERMINAL DEVICE

CROSS-REFERENCE TO RELATED APPLICATIONS

This application is a national stage of International Application No. PCT/CN2017/089417, filed on Jun. 21, 2017, which claims priority to Chinese patent application No. 201610472755.0, filed on Jun. 23, 2016. Both of the aforementioned applications are hereby incorporated by reference in their entireties.

TECHNICAL FIELD

The present invention relates to the field of computer technologies, and in particular, to a method and an apparatus for optimizing a model applicable to pattern recognition, and a terminal device.

BACKGROUND

An existing terminal device (for example, a smartphone (Smart Phone, SP)) usually runs various algorithm instructions by using a general-purpose computing unit. The general-purpose computing unit usually uses an advanced reduced instruction set computer (Reduced Instruction Set Computer, RISC) machine (Advanced RISC Machines, ARM) system architecture, for example, a central processing unit (Central Processing Unit, CPU). In the system architecture, if algorithm instructions are run concurrently by using a plurality of threads, power consumption is extremely high, and this is unacceptable for a battery-charged terminal device. If algorithm instructions are run by using a single thread, an operation capability cannot meet a requirement of a large computing amount. For example, in fields such as speech recognition and computer vision, an extremely large computing amount is required in a training process of a model applicable to pattern recognition (for example, training of an acoustic model). However, because power consumption of a terminal device is limited, or a requirement of a large computing amount cannot be met, model training is usually performed in cloud in the prior art, and then a model is pushed to the terminal device for recognizing a voice, an image, a video, or the like.

However, when the model applicable to pattern recognition is trained in the cloud, because training is usually performed according to a sample (for example, a voice file, a face image, or a video file) uploaded by at least one terminal device, an obtained model is universal. For example, when speech recognition is performed, voices of all users may be recognized by using the model, and recognition is not performed for a voice of a specific user, that is, the model does not have a personalized feature. However, a user expects that a terminal device can recognize only a voice of the user, and does not recognize or cannot well recognize a voice of another user, that is, the user wants to train a relatively personalized model. Therefore, a requirement of optimizing the model applicable to pattern recognition is imposed.

SUMMARY

Embodiments of the present invention provide a method and an apparatus for optimizing a model applicable to pattern recognition, and a terminal device, so as to obtain a relatively personalized model, and reduce a computing amount of a server.

According to a first aspect, a method for optimizing a model applicable to pattern recognition is provided, where the method includes:

receiving, by a terminal device, a universal model delivered by a server, where the universal model is obtained by the server according to a sample uploaded by at least one terminal device, and the universal model includes an original feature parameter;

recognizing target information by using the universal model, and collecting a plurality of local samples;

when a model optimization condition is met, obtaining a new feature parameter according to the plurality of local samples, the original feature parameter, and a first training algorithm, where the first training algorithm is a machine learning algorithm used to correct an original feature parameter according to a local sample to obtain a new feature parameter; and optimizing the universal model according to a second training algorithm and the new feature parameter, to obtain an optimized universal model.

To obtain a relatively personalized model, in a process of recognizing the target information by using the universal model, the terminal device may continue to collect the local samples. Because the local samples are used by the terminal device in a process of optimizing the universal model, after collecting the local samples, the terminal device only locally stores the local samples, and does not need to upload the local samples to the server. Therefore, traffic consumed for uploading the samples by the terminal device to the server can be saved. In addition, because the universal model is obtained by the server according to hundreds of millions of samples or billions of samples uploaded by the at least one terminal device, accuracy of recognizing information by using the universal model is relatively high. Then the universal model is optimized to obtain a relatively personalized model. Therefore, not only a computing amount of the terminal device can be reduced, but also accuracy of recognizing information of a specific user can be improved.

In an optional implementation, the model optimization condition may include one or more of the following:

a quantity of local samples reaches a preset quantity, current time reaches preset time, the terminal device is in a preset state, or an attribute value of the terminal device reaches a preset threshold.

In an optional implementation, the first training algorithm may include one or more of the following:

a hidden Markov model HMM training algorithm, a forward algorithm, a Viterbi algorithm, a forward-backward algorithm, an expectation maximization EM algorithm, a deep neural network DNN algorithm, a convolutional neural network CNN algorithm, or a recurrent neural network RNN algorithm.

According to a second aspect, an apparatus for optimizing a model applicable to pattern recognition is provided, and the apparatus has a function of implementing a behavior of the terminal device in the foregoing method. The function may be implemented by using hardware, or may be implemented by implementing corresponding software by hardware. The hardware or software includes one or more modules corresponding to the foregoing function.

According to a third aspect, a terminal device is provided, where the terminal device includes a transceiver and a processing circuit. The transceiver is configured to receive a universal model delivered by a server, where the universal model is obtained by the server according to a sample uploaded by at least one terminal device, and the universal model includes an original feature parameter. The processing circuit is configured to: recognize target information by using the universal model, and collect a plurality of local samples; when a model optimization condition is met, obtain a new feature parameter according to the plurality of local samples, the original feature parameter, and a first training algorithm, where the first training algorithm is a machine learning algorithm used to correct an original feature parameter according to a local sample to obtain a new feature parameter; and optimize the universal model according to a second training algorithm and the new feature parameter, to obtain an optimized universal model.

According to still another aspect, a computer storage medium is provided, and is configured to store a computer software instruction used by the foregoing terminal device. The computer software instruction includes a program designed to execute the foregoing aspects.

The embodiments of the present invention provide the method and the apparatus for optimizing a model applicable to pattern recognition, and the terminal device. The terminal device receives the universal model delivered by the server, where the universal model includes the original feature parameter; recognizes the target information by using the universal model, and collects the plurality of local samples; when the model optimization condition is met, corrects the original feature parameter by using the first training algorithm to obtain the new feature parameter; and optimizes the universal model according to the second training algorithm and the new feature parameter, to obtain the optimized universal model. That is, in the present invention, the terminal device further optimizes, according to the collected local samples, the universal model received from the server to obtain a relatively personalized model applicable to pattern recognition. Therefore, not only user experience is improved, but also a problem of a large computing amount of the server that exists when the server optimizes the universal model is resolved.

DESCRIPTION OF EMBODIMENTS

Figure 1:
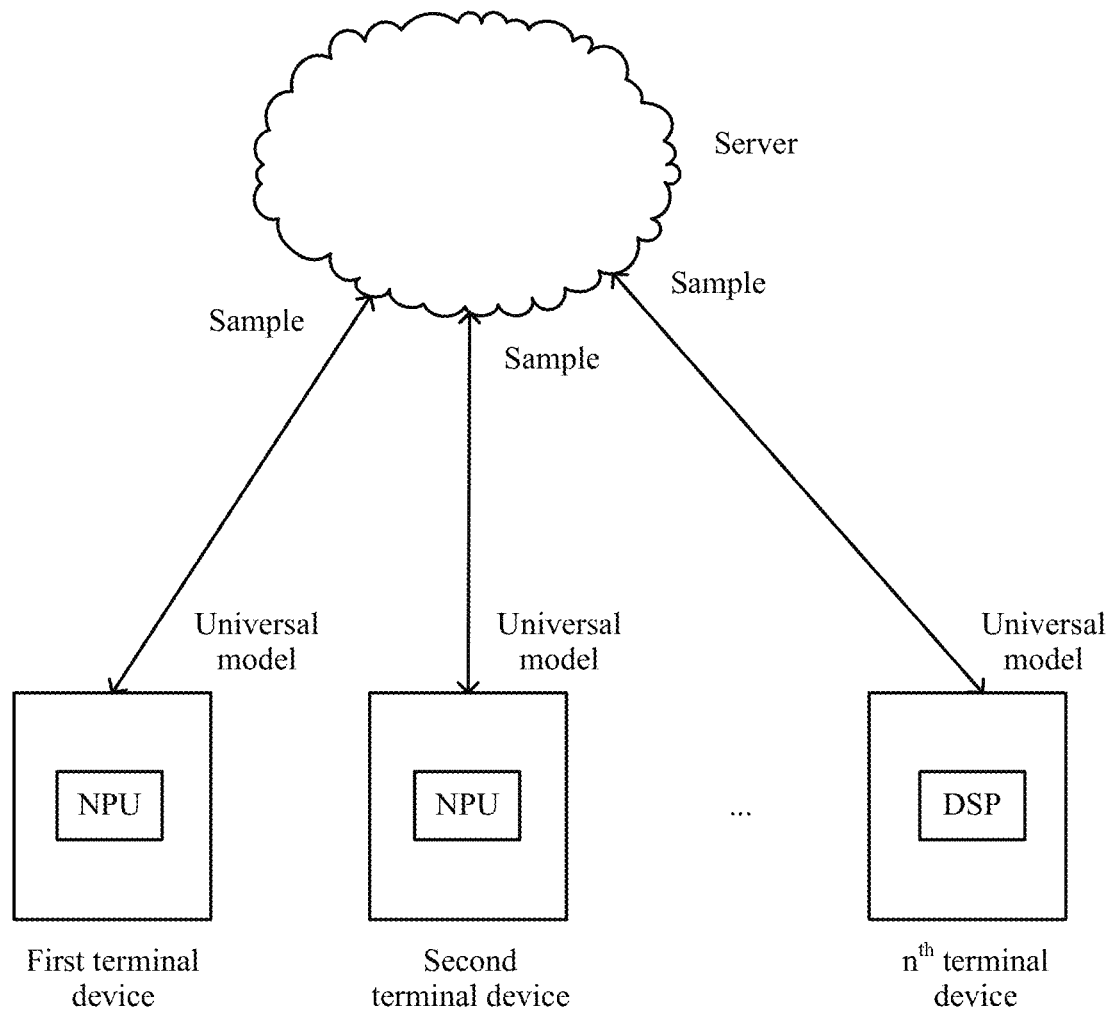
FIG. 1 is a schematic structural diagram of a network according to the present invention.

The technical solutions of the present invention are further described in detail with reference to accompanying drawings and embodiments as follows:

A method for optimizing a model applicable to pattern recognition according to an embodiment of the present invention is applied to a structural diagram of a network topology shown in FIG. 1. In FIG. 1, a server may perform data communication with a terminal device. Specifically, the server may receive a sample uploaded by at least one terminal device. The sample includes but is not limited to a voice file, an image file, and a video file. For example, the terminal device may collect a voice file in the following manner: The terminal device may collect a voice file that is recorded by recording software of the terminal device when a user is in a call, may collect a voice file that is recorded by the terminal device when a user makes a voice chat by using instant messaging software, or may collect a voice file that is recorded in another scenario in which a voice signal of a user can be received. For another example, the terminal device may collect an image file and a video in the following manner: The terminal device may collect an image file or a video that is recorded by the terminal device when a user takes a photo or video, or the terminal device may obtain an image file or a video from application software (for example, Weibo, WeChat Moments, and Qzone), or the like. Alternatively, the server may collect a sample by itself.

In FIG. 1, after receiving sufficient samples (for example, hundreds of millions or billions of samples) sent by the at least one terminal device, the server first preprocesses the samples, where preprocessing on the samples may include processing such as classification processing and addition of annotation information, and then obtains a universal model according to the samples. Specifically, the universal model may be obtained by training a training algorithm according to the samples. When the sample is a voice file herein, the obtained universal model may be a speech recognition model, and the universal model may be used to recognize voice information (or referred to as a voice signal). When the sample is an image file, the obtained universal model may be an image recognition model, and the universal model may be used to recognize image information. Alternatively, when the sample is a video file, the obtained universal model may be a video recognition model, and the universal model may be used to recognize video information.

The training algorithm includes but is not limited to a hidden Markov model (Hidden Markov Model, HMM) training algorithm, a forward algorithm (Forward Algorithm), a Viterbi algorithm (Viterbi Algorithm), a forward-backward algorithm (Forward-Backward Algorithm), an expectation maximization (Expectation Maximization, EM) algorithm, a deep neural network (Deep Neural Network, DNN) learning algorithm, a convolutional neural network (Convolutional Neural Network, CNN) learning algorithm, and a recurrent neural network (Recurrent Neural Network, RNN) learning algorithm. In addition, the obtained universal model may include one or more original feature parameters. In an example that the universal model is the speech recognition model, the original feature parameter is a voice parameter, or is referred to as an acoustic model parameter, and the original feature parameter may include but not limited to a Mel-frequency cepstral coefficient (Mel Frequency Coefficient, MFCC) parameter and a pitch frequency parameter. In an example that the universal model is the image recognition model, the original feature parameter is an image parameter (or referred to as an image model parameter), and the original feature parameter may include but not limited to parameters such as a color, a texture, and a shape.

The terminal device in FIG. 1 may have a dedicated digital signal processor (Digital Signal Process, DSP) chip or a neural processing unit (Neural Processing Unit, NPU) chip, and the chip may meet a requirement of a large computing amount of a neural network. Alternatively, the terminal device in the present invention has a capability of computing a large amount of data (for example, a computing capability of implementing multiplication or addition of matrices), and the terminal device includes but is not limited to a mobile phone, a mobile computer, a tablet computer, a personal digital assistant (Personal Digital Assistant, PDA), a media player, a smart TV, a smartwatch, smart glasses, or a smart band.

It may be understood that generally each terminal device is used by one fixed user, that is, each terminal device may be corresponding to one specific user. Therefore, a sample collected by a terminal device is usually associated with a personal feature of a specific user. However, when the server obtains the universal model according to the sample uploaded by the at least one terminal device, the universal model can recognize information (including voice information, image information, and video information) of all users, that is, the universal model has a relatively good universality. However, when the universal model is delivered to a terminal device, and the terminal device uses the universal model to recognize information of a corresponding specific user, regardless of a quantity of times of recognizing the information of the specific user by using the universal model and duration of recognizing the information of the specific user, accuracy of recognizing the information of the specific user cannot be improved, that is, the universal model obtained by the server does not have a personalized feature. However, to improve user experience, it is usually expected to improve the accuracy of recognizing the information of the specific user by the terminal device, and the terminal device may not recognize information of another user. Therefore, the universal model delivered by the server needs to be optimized.

Figure 2:
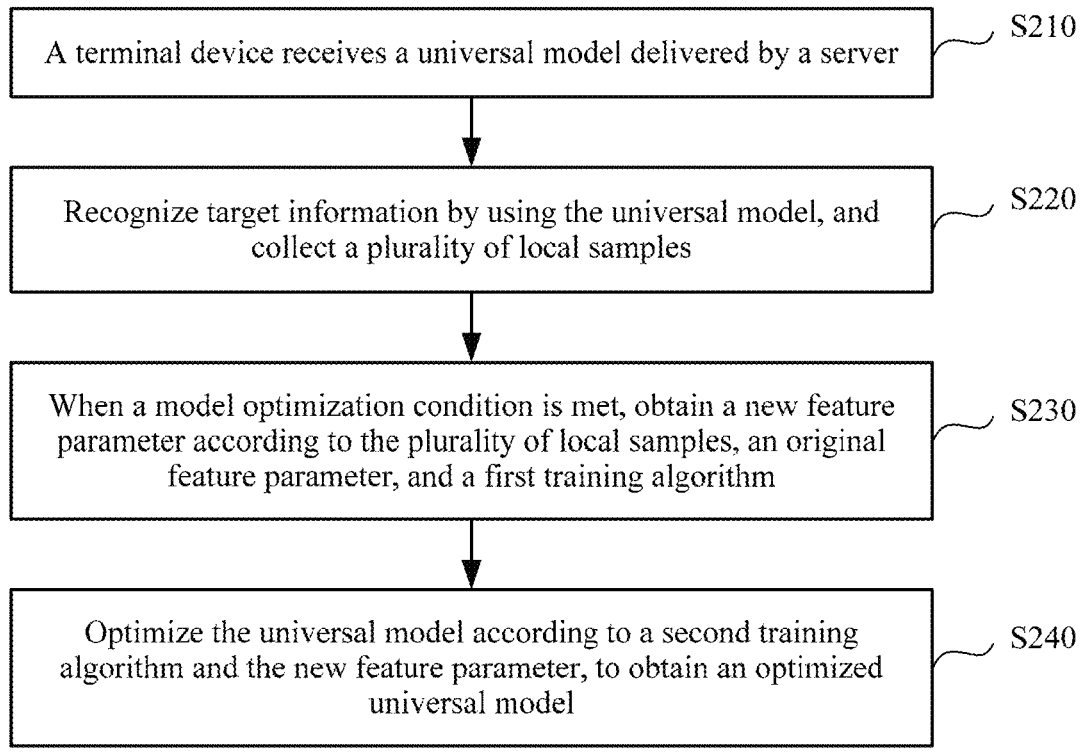
FIG. 2 is a flowchart of a method for optimizing a model applicable to pattern recognition according to an embodiment of the present invention.

FIG. 2 is a flowchart of a method for optimizing a model applicable to pattern recognition according to an embodiment of the present invention. The method may be executed by a terminal device. As shown in FIG. 2, the method may specifically include the following steps.

Step 210: The terminal device receives a universal model delivered by a server.

As described above, the universal model is obtained by the server according to a sample uploaded by at least one terminal device. The universal model may include one or more original feature parameters. In an example, when there are a plurality of original feature parameters, the plurality of original feature parameters may be stored in a first matrix, to facilitate management.

Step 220: Recognize target information by using the universal model, and collect a plurality of local samples.

The target information includes but is not limited to voice information, image information, and video information herein. Specifically, when the universal model herein is a speech recognition model, voice information input by a user may be recognized by using the speech recognition model, to obtain a text corresponding to the voice information. When the universal model herein is an image recognition model, image information may be recognized by using the image recognition model, and the image information herein includes but is not limited to a face image and an image that includes an object. When the universal model herein is a video recognition model, video information may be recognized by using the video recognition model, and the video information herein includes image information.

It should be noted that to obtain a relatively personalized model, in a process of recognizing the target information by using the universal model, the terminal device may continue to collect the local samples. Because the local samples are used by the terminal device in a process of optimizing the universal model, after collecting the local samples, the terminal device only locally stores the local samples, and does not need to upload the local samples to the server. Therefore, traffic consumed for uploading the samples by the terminal device to the server can be saved. The local samples may include but not limited to a voice file, an image file, and a video file.

Step 230: When a model optimization condition is met, obtain a new feature parameter according to the plurality of local samples, the original feature parameter, and a first training algorithm, where the first training algorithm is a machine learning algorithm used to correct an original feature parameter according to a local sample to obtain a new feature parameter.

The model optimization condition herein may include one or more of the following:

a quantity of local samples reaches a preset quantity, current time reaches preset time, the terminal device is in a preset state, or an attribute value of the terminal device reaches a preset threshold.

For example, that a quantity of local samples reaches a preset quantity may be that a quantity of collected voice files, image files, or video files exceeds 5000. For example, that current time reaches preset time may be that the current time exceeds 12:00 P.M. For example, that the terminal device is in a preset state may be that the terminal device is in a charging or standby state. For example, that an attribute value of the terminal device reaches a preset threshold may be that a battery level of the terminal device exceeds 80% or a temperature of the terminal device is lower than 25 degrees.

In addition, the first training algorithm may be consistent with a training algorithm used by the server to obtain the universal model. For example, when the server obtains the universal model according to a deep learning algorithm and the samples, the terminal device may also correct the original feature parameter in the universal model according to the deep learning algorithm.

Figure 3:
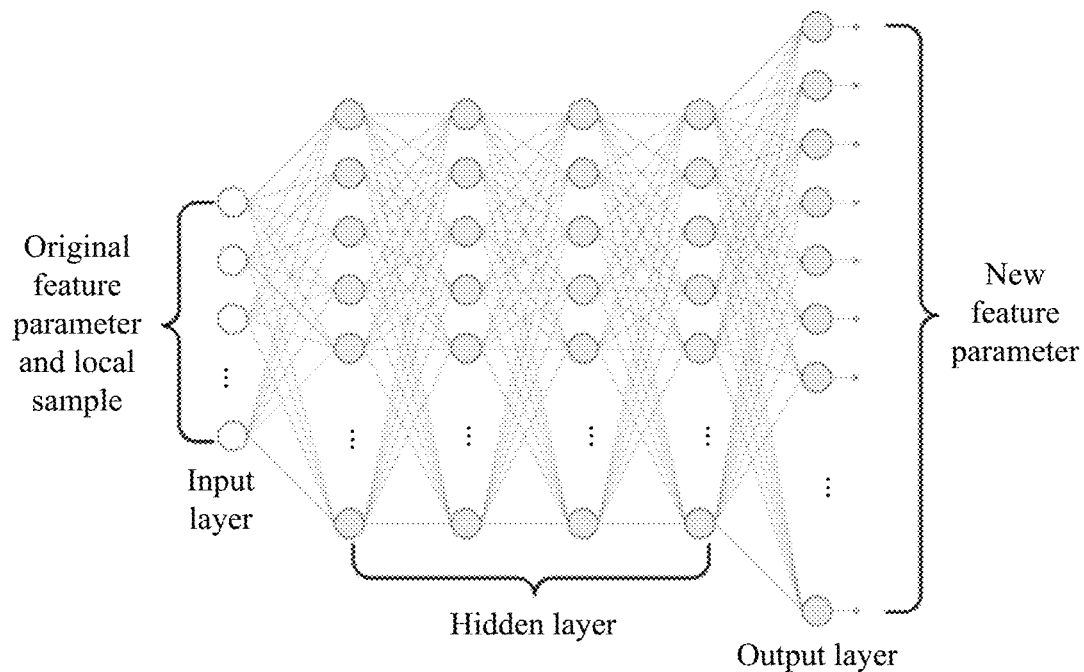
FIG. 3 is a schematic diagram of a training process of a first training algorithm according to the present invention.

For example, when the first training algorithm is the deep learning algorithm, a method for correcting the original feature parameter in the universal model may be shown in FIG. 3. In FIG. 3, the deep learning algorithm includes three layers: an input layer, a hidden layer, and an output layer. The input layer is used to input input data. The input data herein includes the original feature parameter and the local samples. The input layer may include one column of "○" (referred to as a node), and each node is configured to input one piece of input data. For example, original feature parameters are $a_1, a_2, \ldots,$ and $a_n$, where $n \geq 1$, that is, there are n original feature parameters, and the n original feature parameters and the local samples may be input at the input layer of the deep learning algorithm. The hidden layer is used to correct, according to the local samples, the n original feature parameters input at the input layer, and correction is specifically implemented by performing corresponding computing on the input data. In FIG. 3, each node in a $k^{th}$ column at the hidden layer is used to indicate a result obtained after a $k^{th}$ time of computing is performed on the input data. Each node in any column is determined according to a linear combination of all nodes in a column prior to the any column, for example, each node in the first column at the hidden layer indicates a corresponding result obtained after the first time of computing is performed on the input data. It is assumed that a $j^{th}$ node in the first column at the hidden layer may be denoted as $y_{2j}$, and a computing formula of $y_{2j}$ may be $y_{2j} = f(\Sigma x_{1i} \Box \omega_{1i} + b)$, where $x_{1i}$ indicates an $i^{th}$ piece of input data, $\omega$ and b may be set according to empirical values, and f may be autonomously selected. The output layer is used to output input data obtained after computing, the output layer may include one column of "○", and each node is configured to output one piece of input data obtained after computing, for example, output one new feature parameter. It is assumed that all output new feature parameters may be $b_1, b_2, \ldots,$ and $b_m$, where $m \geq n$, that is, a quantity of new feature parameters is greater than or equal to the quantity of original feature parameters. In an example, the new feature parameters output at the output layer may be recorded in a second matrix.

It may be understood that although the training algorithm used by the terminal device to correct the original feature parameter is consistent with the training algorithm used by the server to obtain the universal model, a computing amount of the server is far greater than a computing amount of the terminal device, because a quantity of local samples collected by the terminal device is only thousands, while a quantity of samples that are uploaded by at least one terminal device and that are received by the server is hundreds of millions or billions.

In addition, in FIG. 3, a sample input at the input layer is a local sample. For example, when an original feature parameter in the speech recognition model is corrected, the local sample input at the input layer is a voice file of a specific user corresponding to the terminal device, and no voice file of another user is input. Therefore, the new feature parameter output at the output layer has a personalized feature, that is, voice information of the specific user can be better recognized after the universal model is optimized according to the new feature parameter, and voice information of another user cannot be recognized or cannot be well recognized. For another example, when an original feature parameter in the image recognition model is corrected, a local sample input at the input layer may be a face image of a specific user, and no face image of another user is input. Therefore, a new feature parameter output at the output layer has a personalized feature, that is, image information of the specific user can be better recognized after the universal model is optimized according to the new feature parameter.

In addition, the terminal device may further correct the original feature parameter in the universal model according to an HMM training algorithm, a forward algorithm, a Viterbi algorithm, a forward-backward algorithm, an EM algorithm, a DNN learning algorithm, a CNN learning algorithm, or an RNN learning algorithm.

To obtain a personalized model of relatively high precision in the present invention, that is, to improve accuracy of recognizing information of a specific user, the universal model may be optimized according to the new feature parameter.

Step 240: Optimize the universal model according to a second training algorithm and the new feature parameter, to obtain an optimized universal model.

To obtain the personalized model of relatively high precision, the universal model received from the server may be optimized. The second training algorithm herein may include but not limited to a Bayesian statistics modeling algorithm and a vector machine modeling algorithm.

As described above, the original feature parameter in the universal model may be stored in the first matrix, and the obtained new feature parameter may be stored in the second matrix. In an example, the first matrix may be a 3000-dimensional (that is, n=3000) matrix, and the second matrix may be a 9000-dimensional (that is, m=9000) matrix. A process of optimizing the universal model according to the second training algorithm and the new feature parameter may specifically include the following: The first matrix and the second matrix are added or multiplied to obtain a target matrix, where the target matrix includes a feature parameter in the optimized universal model, the original feature parameter in the universal model is then replaced with the feature parameter in the optimized universal model, and therefore the optimized universal model can be obtained. It may be understood that because the first matrix and the second matrix have different quantities of dimensions, before the first matrix and the second matrix are added or multiplied, the quantities of dimensions of the two matrices may be uniformed by adding "0". In the foregoing example, the first matrix may be expanded to a 9000-dimensional matrix by adding "0", and then the first matrix and the second matrix are added or multiplied.

Certainly, during actual application, the quantities of dimensions of the two matrices may alternatively be uniformed in another manner. This is not limited in this application. For example, in matlab, a manner of adding a "nan value" may be used. The "nan value" is used to indicate a value that does not have an actual meaning. Specifically, when the "nan value" is processed in matlab, the "nan value" is skipped, and no processing is performed.

Certainly, only an example is used to describe a manner of optimizing the universal model in the foregoing, and does not impose a limitation on the present invention. A manner of optimizing the universal model may be determined according to the used second training algorithm, and is not enumerated in the present invention.

It should be noted that step 210 to step 230 are only a process of optimizing the universal model at a time, and a person skilled in the art may continuously repeatedly perform step 210 to step 230, that is, accuracy of recognizing information of a specific user can be improved by continuously combining personalized information of the specific user with the universal model.

In conclusion, the terminal device in the present invention first receives the universal model delivered by the server, and then optimizes the universal model to obtain a relatively personalized model. Herein, because the universal model is obtained by the server according to hundreds of millions of samples or billions of samples uploaded by at least one terminal device, accuracy of recognizing information by using the universal model is relatively high. Therefore, not only a computing amount of the terminal device can be reduced, but also accuracy of recognizing information of a specific user can be improved.

Figure 4:
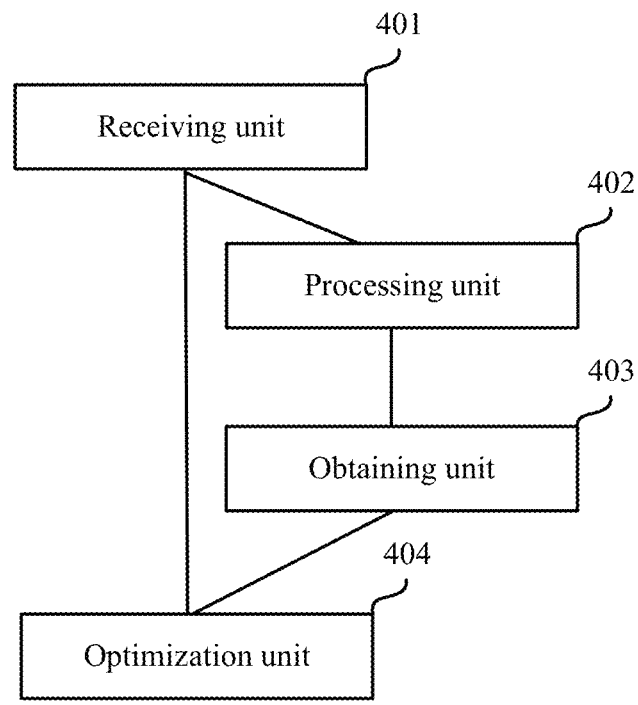
FIG. 4 is a schematic diagram of an apparatus for optimizing a model applicable to pattern recognition according to another embodiment of the present invention.

Corresponding to the method for optimizing a model applicable to pattern recognition, an embodiment of this application further provides an apparatus for optimizing a model applicable to pattern recognition. As shown in FIG. 4, the apparatus includes a receiving unit 401, a processing unit 402, an obtaining unit 403, and an optimization unit 404.

The receiving unit 401 is configured to receive a universal model delivered by a server. The universal model is obtained by the server according to a sample uploaded by at least one terminal device, and the universal model includes an original feature parameter.

The processing unit 402 is configured to: recognize target information by using the universal model received by the receiving unit 401, and collect a plurality of local samples.

The obtaining unit 403 is configured to: when a model optimization condition is met, obtain a new feature parameter according to the plurality of local samples, the original feature parameter, and a first training algorithm. The first training algorithm is a machine learning algorithm used to correct an original feature parameter according to a local sample to obtain a new feature parameter.

The model optimization condition includes one or more of the following:

a quantity of local samples reaches a preset quantity, current time reaches preset time, a terminal device is in a preset state, or an attribute value of a terminal device reaches a preset threshold.

In addition, the first training algorithm includes one or more of the following:

a hidden Markov model HMM training algorithm, a forward algorithm, a Viterbi algorithm, a forward-backward algorithm, an expectation maximization EM algorithm, a deep neural network DNN algorithm, a convolutional neural network CNN algorithm, or a recurrent neural network RNN algorithm.

The optimization unit 404 is configured to optimize the universal model according to a second training algorithm and the new feature parameter, to obtain an optimized universal model.

According to the apparatus for optimizing a model applicable to pattern recognition that is provided in this embodiment of the present invention, the receiving unit 401 receives the universal model delivered by the server; the processing unit 402 recognizes the target information by using the universal model, and collects the plurality of local samples; the obtaining unit 403 obtains the new feature parameter according to the plurality of local samples, the original feature parameter, and the first training algorithm when the model optimization condition is met; and the optimization unit 404 optimizes the universal model according to the second training algorithm and the new feature parameter, to obtain the optimized universal model. Therefore, not only user experience is improved, but also a problem of a large computing amount of the server that exists when the server optimizes the universal model is resolved.

Figure 5:
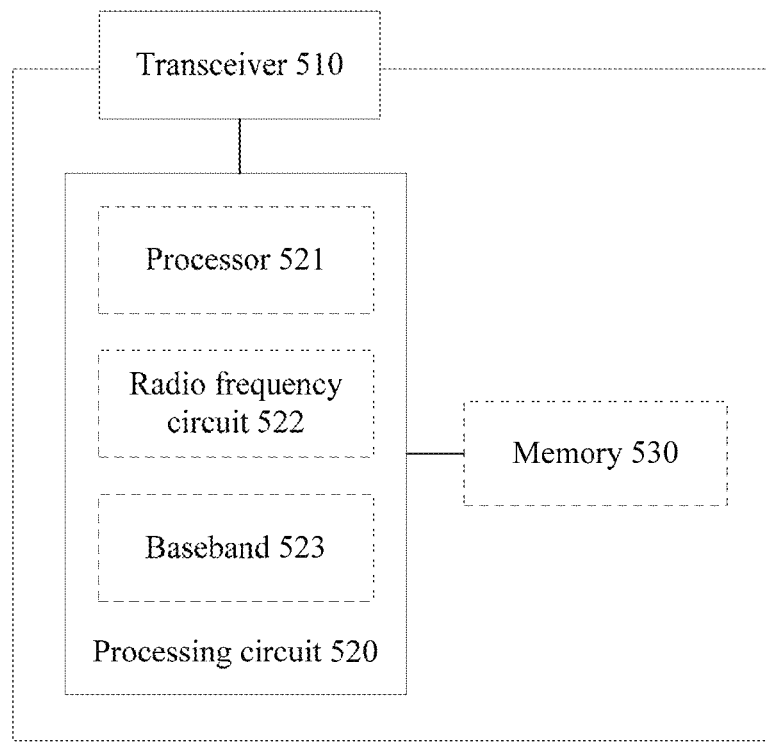
FIG. 5 is a schematic diagram of a terminal device according to still another embodiment of the present invention.

Corresponding to the method for optimizing a model applicable to pattern recognition, an embodiment of this application further provides a terminal device. As shown in FIG. 5, the terminal device includes a transceiver 510 and a processing circuit 520, and optionally may further include a memory 530. The processing circuit 520 may include a processor 521, a radio frequency circuit 522, and a baseband 523.

The processor 521 may include a combination of an NPU, a dedicated DSP, an NPU, and a hardware chip, or a combination of a dedicated DSP and a hardware chip. The NPU or the dedicated DSP provides a computing capability, for example, may implement a multiplication operation or an addition operation of matrices. In addition, the hardware chip may be an application-specific integrated circuit (English: application-specific integrated circuit, ASIC), a programmable logical device (English: programmable logic device, PLD), or a combination thereof. The PLD may be a complex programmable logical device (English: complex programmable logic device, CPLD), a field programmable gate array (English: field-programmable gate array, FPGA), generic array logic (English: generic array logic, GAL), or any combination thereof. In addition, the processor 521 may further include a graphics processing unit (Graphics Processing Unit, GPU).

The memory 530 may include a volatile memory (English: volatile memory), for example, a random access memory (English: random-access memory, RAM). The memory 530 may further include a non-volatile memory (English: non-volatile memory), for example, a read-only memory (English: read-only memory, ROM), a flash memory (English: flash memory), a hard disk drive (English: hard disk drive, HDD), or a solid-state drive (English: solid-state drive, SSD). The memory 530 may further include a combination of the foregoing memories.

The transceiver 510 is configured to receive a universal model delivered by a server. The universal model is obtained by the server according to a sample uploaded by at least one terminal device, and the universal model includes an original feature parameter.

The processing circuit 520 is configured to: recognize target information by using the universal model, and collect a plurality of local samples.

The processing circuit 520 is further configured to: when a model optimization condition is met, obtain a new feature parameter according to the plurality of local samples, the original feature parameter, and a first training algorithm. The first training algorithm is a machine learning algorithm used to correct an original feature parameter according to a local sample to obtain a new feature parameter.

The model optimization condition includes one or more of the following:

a quantity of local samples reaches a preset quantity, current time reaches preset time, the terminal device is in a preset state, or an attribute value of the terminal device reaches a preset threshold.

In addition, the first training algorithm includes one or more of the following:

a hidden Markov model HMM training algorithm, a forward algorithm, a Viterbi algorithm, a forward-backward algorithm, an expectation maximization EM algorithm, a deep neural network DNN algorithm, a convolutional neural network CNN algorithm, or a recurrent neural network RNN algorithm.

The processing circuit 520 is further configured to optimize the universal model according to a second training algorithm and the new feature parameter, to obtain an optimized universal model.

The terminal device for a model that is provided in this embodiment of the present invention first receives the universal model delivered by the server, and then optimizes the universal model to obtain a relatively personalized model. Herein, because the universal model is obtained by the server according to hundreds of millions of samples or billions of samples uploaded by the at least one terminal device, accuracy of recognizing information by using the universal model is relatively high. Therefore, not only a computing amount of the terminal device can be reduced, but also accuracy of recognizing information of a specific user can be improved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method for optimizing a model applicable to pattern recognition, wherein the method comprises:
   receiving, by a terminal device, a universal model delivered by a server, wherein the universal model is obtained by the server according to a sample uploaded by at least one terminal device, and the universal model comprises an original feature parameter;
   recognizing target information by using the universal model, and collecting a plurality of local samples;
   when a model optimization condition is met, obtaining a new feature parameter according to the plurality of local samples, the original feature parameter, and a first training algorithm, wherein the first training algorithm is a machine learning algorithm used to correct an original feature parameter according to a local sample to obtain a new feature parameter; and
   optimizing the universal model according to a second training algorithm and the new feature parameter, to obtain an optimized universal model.

2. The method according to claim 1, wherein the model optimization condition comprises one or more of the following:
   a quantity of local samples reaches a preset quantity, current time reaches preset time, the terminal device is in a preset state, or an attribute value of the terminal device reaches a preset threshold.

3. The method according to claim 1, wherein the first training algorithm comprises one or more of the following:
   a hidden Markov model (HMM) training algorithm, a forward algorithm, a Viterbi algorithm, a forward-backward algorithm, an expectation maximization (EM) algorithm, a deep neural network (DNN) algorithm, a convolutional neural network (CNN) algorithm, or a recurrent neural network (RNN) algorithm.

4. An apparatus for optimizing a model applicable to pattern recognition, wherein the apparatus comprises a receiving unit, a processing unit, an obtaining unit, and an optimization unit;
   the receiving unit is configured to receive a universal model delivered by a server, wherein the universal model is obtained by the server according to a sample uploaded by at least one terminal device, and the universal model comprises an original feature parameter;
   the processing unit is configured to: recognize target information by using the universal model received by the receiving unit, and collect a plurality of local samples;
   the obtaining unit is configured to: when a model optimization condition is met, obtain a new feature parameter according to the plurality of local samples, the original feature parameter, and a first training algorithm, wherein the first training algorithm is a machine learning algorithm used to correct an original feature parameter according to a local sample to obtain a new feature parameter; and
   the optimization unit is configured to optimize the universal model according to a second training algorithm and the new feature parameter, to obtain an optimized universal model.

5. The apparatus according to claim 4, wherein the model optimization condition comprises one or more of the following:
   a quantity of local samples reaches a preset quantity, current time reaches preset time, a terminal device is in a preset state, or an attribute value of a terminal device reaches a preset threshold.

6. The apparatus according to claim 4, wherein the first training algorithm comprises one or more of the following:
   a hidden Markov model (HMM) training algorithm, a forward algorithm, a Viterbi algorithm, a forward-backward algorithm, an expectation maximization (EM) algorithm, a deep neural network (DNN) algorithm, a convolutional neural network (CNN) algorithm, or a recurrent neural network (RNN) algorithm.

7. A terminal device, wherein the terminal device comprises a transceiver and a processing circuit;
   the transceiver is configured to receive a universal model delivered by a server, wherein the universal model is obtained by the server according to a sample uploaded by at least one terminal device, and the universal model comprises an original feature parameter; and
   the processing circuit is configured to:
   recognize target information by using the universal model, and collect a plurality of local samples;
   when a model optimization condition is met, obtain a new feature parameter according to the plurality of local samples, the original feature parameter, and a first training algorithm, wherein the first training algorithm is a machine learning algorithm used to correct an original feature parameter according to a local sample to obtain a new feature parameter; and
   optimize the universal model according to a second training algorithm and the new feature parameter, to obtain an optimized universal model.

8. The terminal device according to claim 7, wherein the model optimization condition comprises one or more of the following:
   a quantity of local samples reaches a preset quantity, current time reaches preset time, the terminal device is in a preset state, or an attribute value of the terminal device reaches a preset threshold.

9. The terminal device according to claim 7, wherein the first training algorithm comprises one or more of the following:
   an hidden Markov model (HMM) training algorithm, a forward algorithm, a Viterbi algorithm, a forward-backward algorithm, an expectation maximization (EM) algorithm, a deep neural network (DNN) algorithm, a convolutional neural network (CNN) algorithm, or a recurrent neural network (RNN) algorithm.

10. The terminal device according to claim 7, wherein the processing circuit comprises a neural processing unit NPU or a dedicated digital signal processor DSP.

11. The method according to claim 2, wherein the first training algorithm comprises one or more of the following:

an HMM training algorithm, a forward algorithm, a Viterbi algorithm, a forward-backward algorithm, an EM algorithm, a DNN algorithm, a CNN algorithm, or an RNN algorithm.

12. The apparatus according to claim 5, wherein the first training algorithm comprises one or more of the following:
an HMM training algorithm, a forward algorithm, a Viterbi algorithm, a forward-backward algorithm, an EM algorithm, a DNN algorithm, a CNN algorithm, or an RNN algorithm.

13. The terminal device according to claim 8, wherein the first training algorithm comprises one or more of the following:
an HMM training algorithm, a forward algorithm, a Viterbi algorithm, a forward-backward algorithm, an EM algorithm, a DNN algorithm, a CNN algorithm, or an RNN algorithm.

14. The terminal device according to claim 8, wherein the processing circuit comprises an NPU or a dedicated DSP.

15. The terminal device according to claim 9, wherein the processing circuit comprises an NPU or a dedicated DSP.

* * * * *